Patented Oct. 15, 1940

2,218,490

UNITED STATES PATENT OFFICE 2,218,490

SULPHANILYL GUANIDINE AND PROCESS FOR MAKING IT

Philip Stanley Winnek, Stamford, Conn., assignor to American Cyanamid Company, New York, N. Y., a corporation of Maine No Drawing. Application February 23, 1940, Serial No. 320,430

2 Claims. (Cl. 260—556)

The present invention relates to the guanidine analog of sulphanilamide and the process of making it.

The compound of this invention is useful as a chemotherapeutic agent and also as an intermediate in the preparation of other compounds.

While the present invention is not limited to any particular method of preparing this new compound, p-nitrobenzene sulphonyl guanidine compounds can be prepared by adding p-nitrobenzene sulphonyl chloride to an aqueous solution of guanidine and keeping the pH of the mixture slightly on the alkaline side by the addition of sodium hydroxide. After the reaction is complete, the p-nitrobenzene sulphonyl guanidine is separated by filtration and purified by crystallization from water.

p-Aminobenzene sulphonyl guanidine can be prepared by reducing the nitro compound.

The invention will be described in greater detail in connection with the following specific examples which are merely illustrative of the preferred methods of preparing representative compounds of the class and not intended to limit the scope of the invention. The parts are by weight except in the case of liquids which are expressed in corresponding parts by volume.

Example 1

*p-Nitrobenzene sulphonyl guanidine*

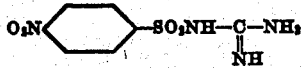

Ten parts of guanidine hydrochloride (0.1 mol) was dissolved in 75 parts of water and the pH adjusted to 8–9. The solution was warmed to 50°–60° C. and kept at this temperature while a slurry of 25 parts (0.113 mol) of p-nitrobenzene sulphonyl chloride was added slowly with mechanical stirring. The pH was kept at 8–9 by the addition of 40% sodium hydroxide solution. At the end of the reaction the solution was cooled and filtered from the separated solid. The p-nitrobenzene sulphonyl guanidine was recrystallized from hot water.

Example 2

*p-Aminobenzene sulphonyl guanidine*

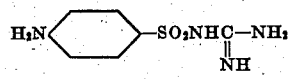

Five parts (0.024 mol) of p-nitrobenzene sulphonyl guanidine was dissolved in 50 parts of boiling 95% alcohol and to the solution was added .5 part of concentrated hydrochloric acid. The solution was heated to reflux and 6 parts of iron dust was added. The suspension was refluxed for 3 hours, made basic with potassium carbonate, and filtered hot. The alcohol was evaporated off and the p-aminobenzene sulphonyl guanidine recrystallized from boiling water with the addition of decolorizing charcoal.

What I claim is:

1. The compound having the following formula:

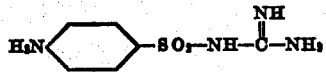

2. The process of producing the compounds of the formula

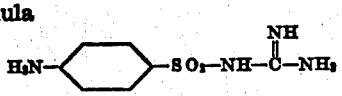

which comprises reacting guanidine with p-nitrobenzene sulphonyl chloride and reducing the resulting product to p-aminobenzenesulphonyl guanidine.

PHILIP STANLEY WINNEK.